(12) United States Patent
Lee et al.

(10) Patent No.: US 8,919,707 B2
(45) Date of Patent: Dec. 30, 2014

(54) SUPPORT CLIP FOR VEHICLE CABLE

(71) Applicant: Daedong System Co., Ltd., Incheon (KR)

(72) Inventors: Ho Chul Lee, Incheon (KR); In Seob Ju, Incheon (KR); Jung Jo Lim, Incheon (KR)

(73) Assignee: Daedong System Co., Ltd., Incheon (KR)

( * ) Notice: Subject to any disclaimer, the term of this patent is extended or adjusted under 35 U.S.C. 154(b) by 60 days.

(21) Appl. No.: 13/650,268

(22) Filed: Oct. 12, 2012

(65) Prior Publication Data
US 2013/0140410 A1    Jun. 6, 2013

(30) Foreign Application Priority Data
Dec. 5, 2011   (KR) .................. 10-2011-0129093

(51) Int. Cl.
*F16L 3/08*       (2006.01)
*F16L 3/12*       (2006.01)

(52) U.S. Cl.
USPC ........... 248/74.1; 248/56; 248/74.2; 248/74.3

(58) Field of Classification Search
CPC ........... F16C 1/105; F16C 1/262; F16H 61/36
USPC ......... 248/56, 74.2, 71, 74.3, 74.1; 24/136 L, 24/115 M; 74/502.4, 502.6
See application file for complete search history.

(56) References Cited

U.S. PATENT DOCUMENTS

| | | | |
|---|---|---|---|
| 3,366,356 A * | 1/1968 | Fisher ............................. | 248/56 |
| 5,272,934 A * | 12/1993 | Chegash et al. .............. | 74/502.4 |
| 5,553,818 A * | 9/1996 | Wild ............................... | 248/56 |
| 7,029,194 B2 * | 4/2006 | Ishikawa et al. .............. | 403/195 |
| 7,445,253 B2 * | 11/2008 | Auchter et al. ............... | 285/420 |

* cited by examiner

*Primary Examiner* — Amy J Sterling
(74) *Attorney, Agent, or Firm* — The PL Law Group, PLLC

(57) ABSTRACT

The present invention provides a support clip for a vehicle cable, which is significantly prevented from being inappropriately coupled to a socket member connected to a cable, and which makes it possible to couple and decouple components without using a tool, thereby assembling and replacing components more efficiently.

5 Claims, 12 Drawing Sheets

PRIOR ART

SUPPORT CLIP FOR VEHICLE CABLE

CROSS-REFERENCE TO RELATED APPLICATION

This application claims priority to Korean Patent Application No. 10-2011-0129093 filed on Dec. 5, 2011 and all the benefits accruing therefrom under 35 U.S.C. §119, the contents of which are incorporated by reference in their entirety.

BACKGROUND

The present invention relates to a vehicle cable supporting clip, and more particularly, to a support clip for a vehicle cable, which prevents inappropriate assembling of components and facilitates coupling and decoupling of components.

Referring to FIG. 1, a cable C may be used to transmit power between the engine and the gearbox of a vehicle, and is fixed to the vehicle through a bracket 140. That is, the bracket 140 supports the cable C and a socket member S surrounding the cable C.

Referring to FIGS. 1 and 2, a support clip through which the bracket 140 supports the cable C and the socket member S includes a first contact part 110, a second contact part 120, and a connecting part 130, and has an accommodation space for accommodating the socket member S.

The first contact part 110 includes a pair of catching protrusions 112 that contact a surface of the bracket 140 and are inserted in positioning recesses 142 of the bracket 140.

Since the catching protrusions 112 are inserted in the positioning recesses 142 of the bracket 140 with the socket member S inserted in the accommodation space, the support clip and the socket member S are securely supported by the bracket 140.

However, since the socket member S tightly contacts the first contact part 110, it is difficult to deform the catching protrusions 112. Thus, when a worker replaces the socket member S and the support clip with new ones or reassembles the socket member S and the support clip, a tool 150 should be used to remove the catching protrusions 112 from the positioning recesses 142 as illustrated in FIG. 2. In particular, when the socket member S and the support clip are coupled again to the bracket 140, the catching protrusions 112 are repeatedly deformed by the tool 150. Thus, when the support clip is reused, durability of the catching protrusions 112 is decreased, so that the catching protrusions 112 can be easily damaged or broken.

As a result, the efficiency in removing the support clip and the socket member S from the bracket 140 is decreased. In addition, when the support clip is reused, durability thereof is decreased, and thus, the service life thereof is also decreased.

In addition, when the support clip is inappropriately coupled to the socket member S, since it is difficult to remove only the socket member S from the support clip, both the socket member S and the support clip should be removed from the bracket 140 by using the tool 150. Thus, a structure for preventing inappropriate assembling of the support clip and the socket member S before complete coupling of the support clip and the socket member S is needed.

SUMMARY

The present invention provides a support clip for a vehicle cable, which is significantly prevented from being inappropriately coupled to a socket member connected to a cable, and which makes it possible to couple and decouple components without using a tool, thereby assembling and replacing components more efficiently.

In accordance with an exemplary embodiment of the present invention, a support clip supports a cable for transmitting power between components of a vehicle so as to fix the cable to the vehicle through a bracket and includes a pair of elastic support parts flush with each other and spaced apart from each other to form an inlet through which a socket member connected to the cable passes, wherein when an outer circumferential surface of the socket member contacts the elastic support parts by means of the weight of the socket member, the elastic support parts elastically support the socket member, thereby preventing the socket member from passing through the inlet; a first ring body part having a ring shape flush with the elastic support parts, wherein when external force overcoming elastic force of the elastic support parts is applied to the socket member, the first ring body part forms a confining space with the elastic support parts to confine the socket member after passing through the inlet; a second ring body part having a ring shape parallel to the first ring body part and connected to the first ring body part, wherein a surface of the second ring body part faces and contacts the bracket; a pair of removal prevention parts integrally formed with the second ring body part in one piece, and catching an outer circumferential surface of the socket member positioned in the confining space, to prevent the socket member from being removed upward; and a support part through which the first ring body part and the second ring body part are supported by the bracket.

The removal prevention parts may be disposed in positions symmetrical to each other with respect to the second ring body part and be inclined downward from the second ring body part such that the removal prevention parts are elastically deformable.

The socket member may include: a first flange disposed between the first and second ring body parts; and a second flange spaced apart from the first flange and contacting a surface of the bracket, wherein the surface of the bracket contacting the second flange is opposite to a surface of the bracket contacting the second ring body, and the removal prevention parts may catch an outer circumferential surface of the socket member between the first and second flanges.

The support part may include a pair of catching hooks which are elastically deformed to pass through a through hole of the bracket and are elastically restored to hook a surface of the bracket such that the support part is removably coupled to the bracket.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, a support clip for a vehicle cable according to an embodiment of the present invention will be described with reference to the accompanying drawings.

Figure 1:
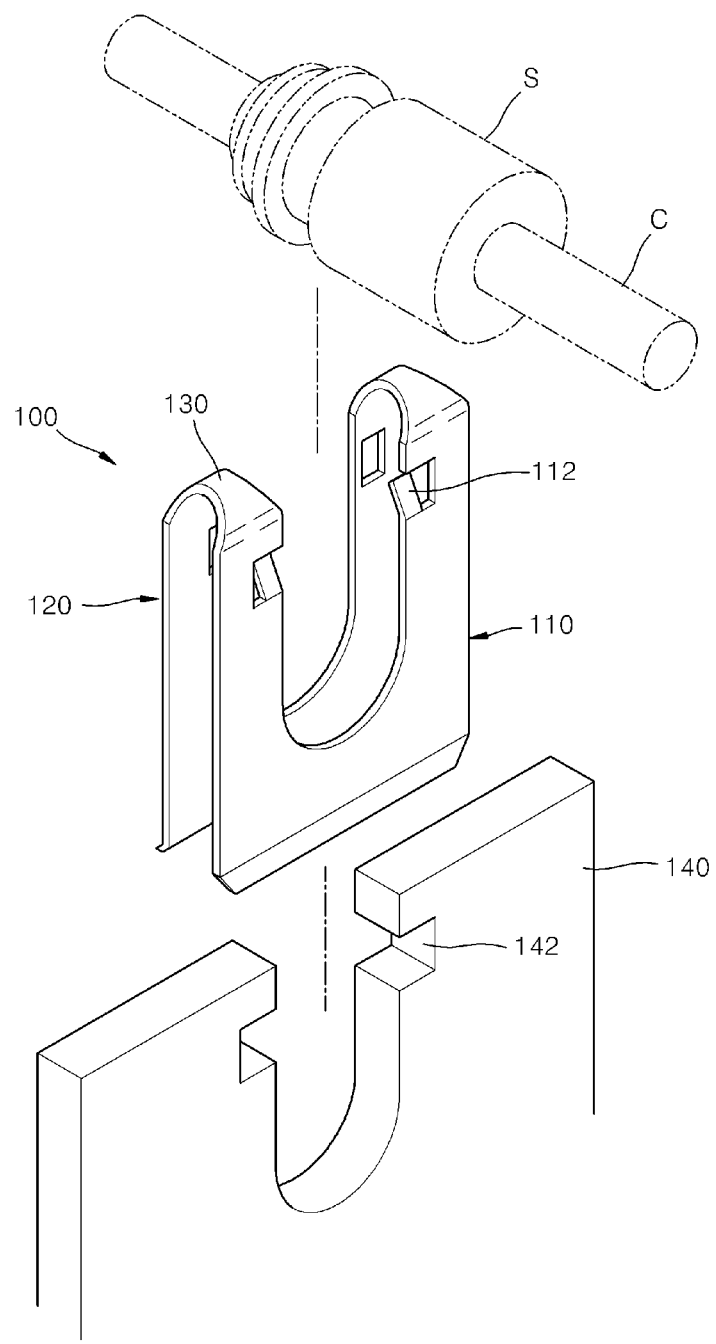
FIG. 1 is a perspective view illustrating a support clip for a vehicle cable in the related art.
Figure 2:
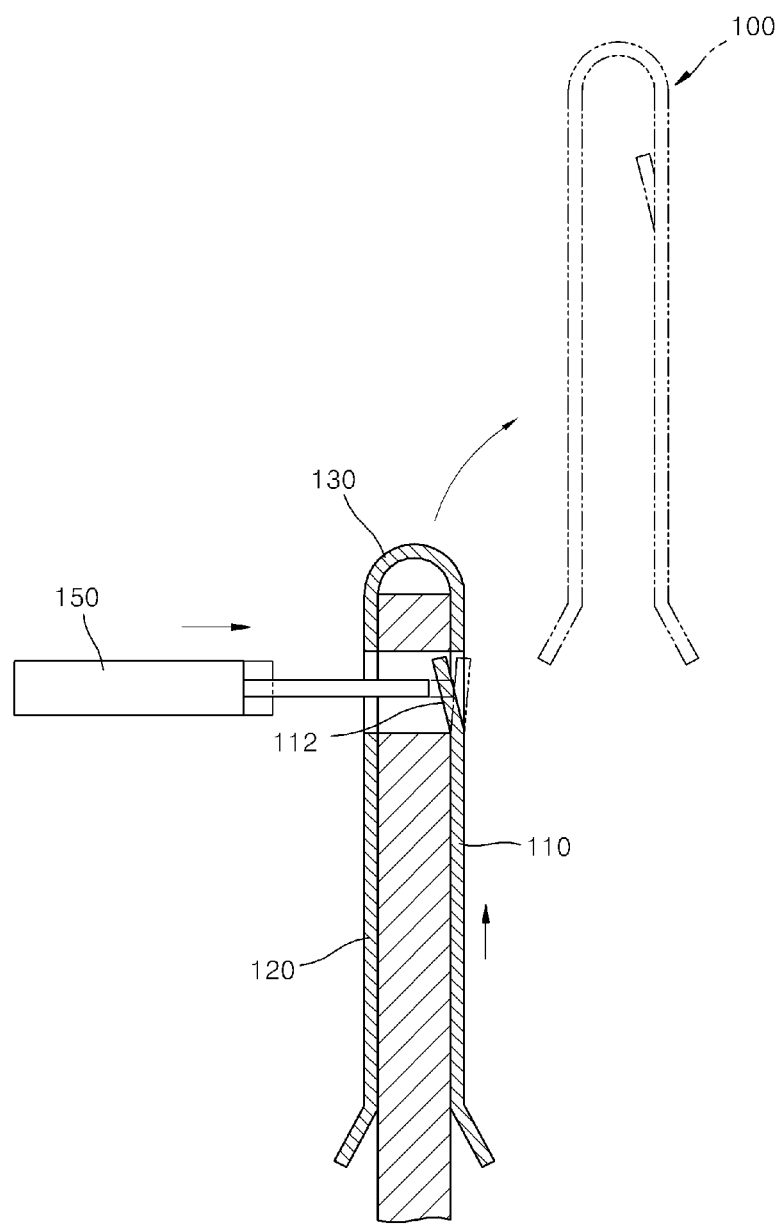
FIG. 2 is a cross-sectional view illustrating an operation of a support clip for a vehicle cable in the related art.
Figure 3:
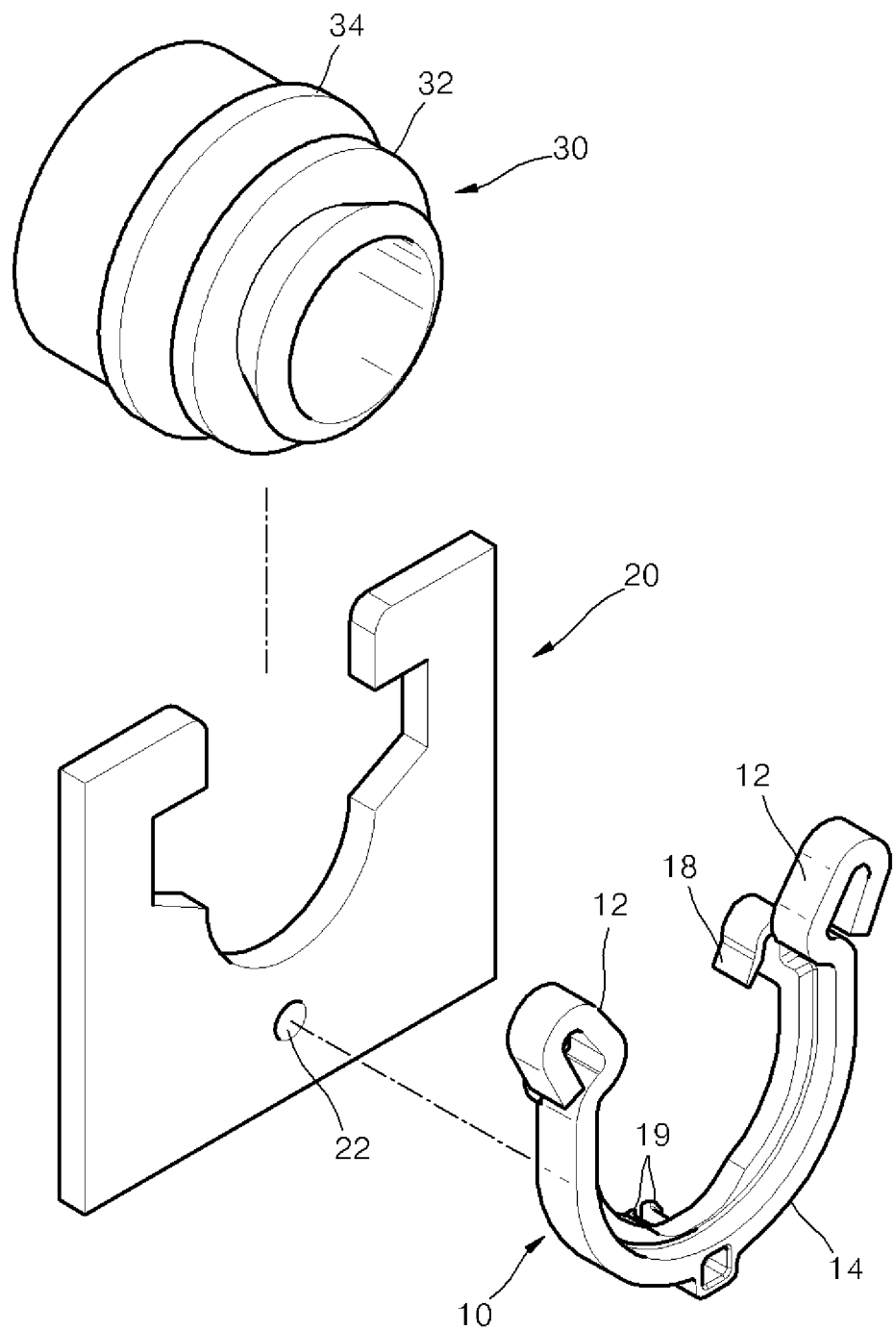
FIG. 3 is a perspective view illustrating a state that a support clip for a vehicle cable is removed from a bracket, according to an embodiment of the present invention.
Figure 4:
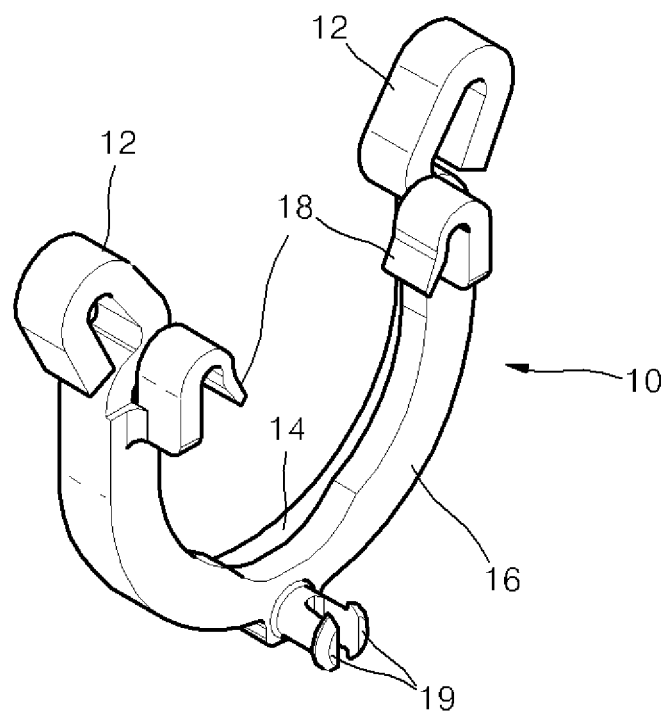
FIG. 4 is a perspective view illustrating a support clip for a vehicle cable according to the embodiment of FIG. 3.
Figure 5:
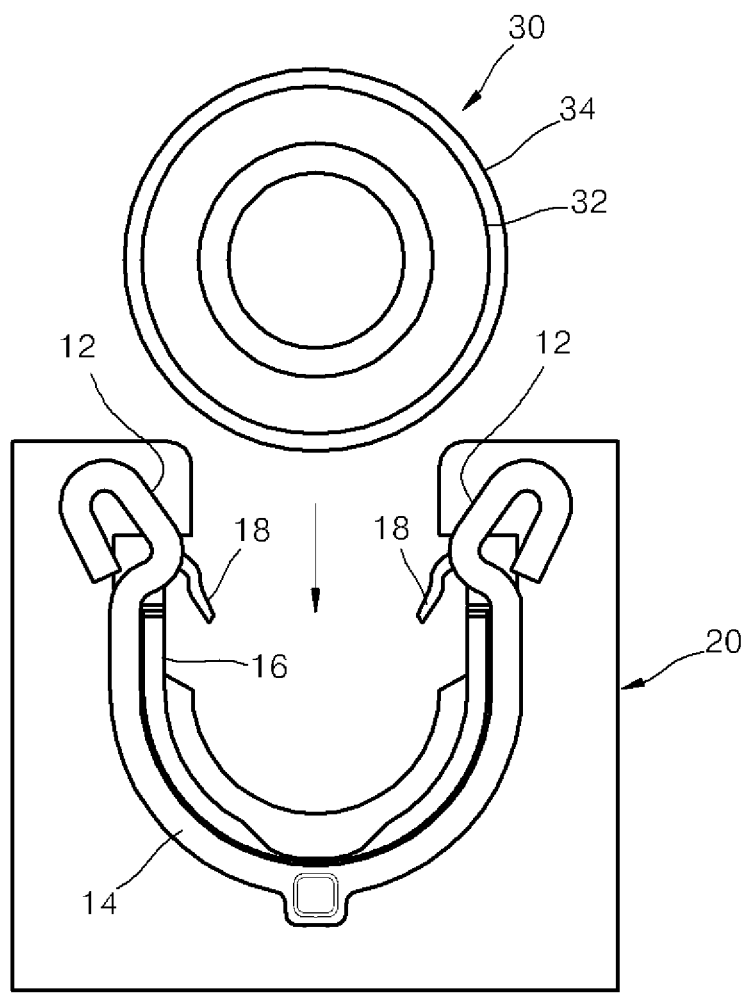
FIG. 5 is a front view illustrating a state that a support clip is coupled to a bracket according to the embodiment of FIG. 3.
Figure 6:
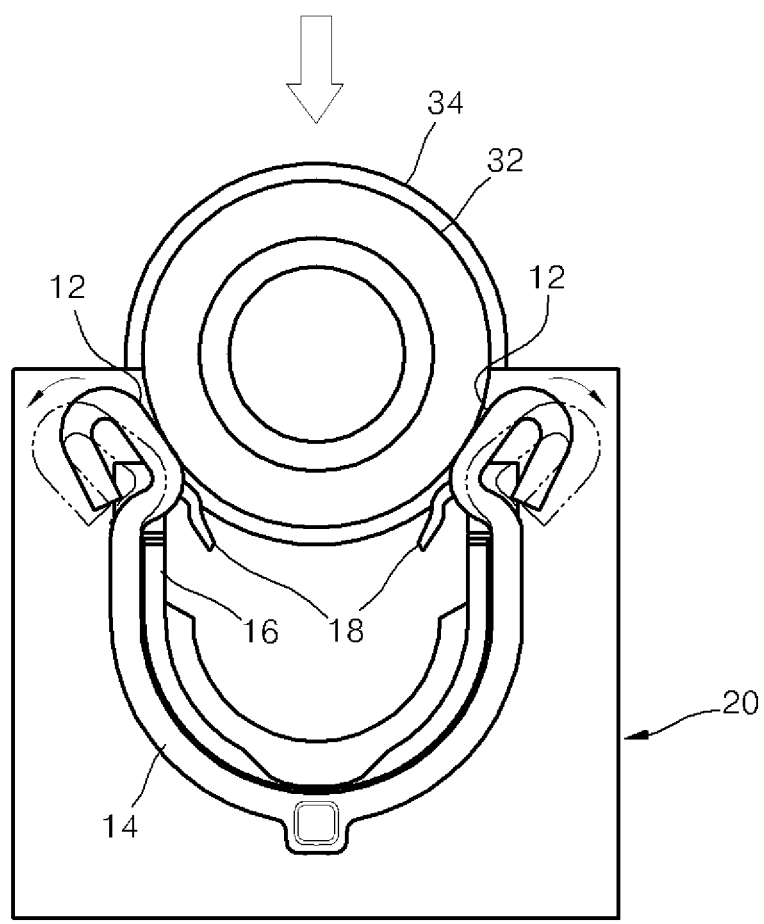
FIG. 6 is a front view illustrating an operation of a support clip according to the embodiment of FIG. 3.
Figure 7:
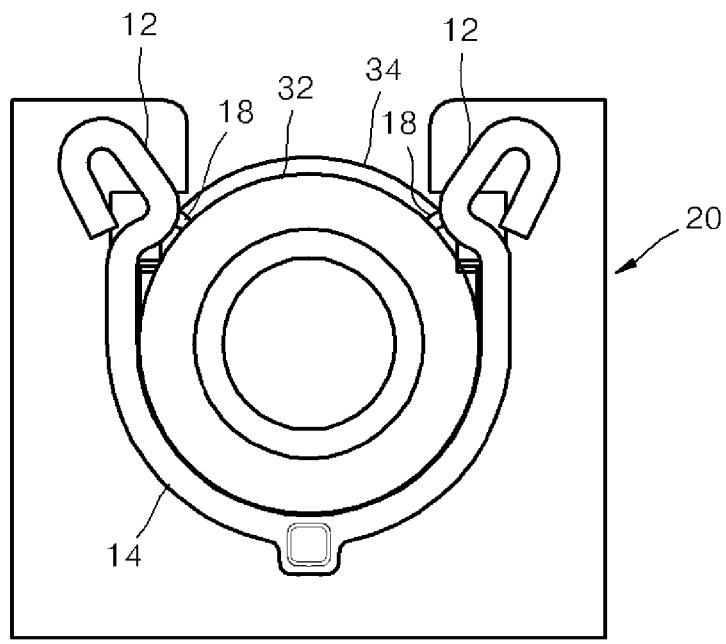
FIG. 7 is a front view illustrating a state that a socket member is coupled to a bracket according to the embodiment of FIG. 3.
Figure 8:
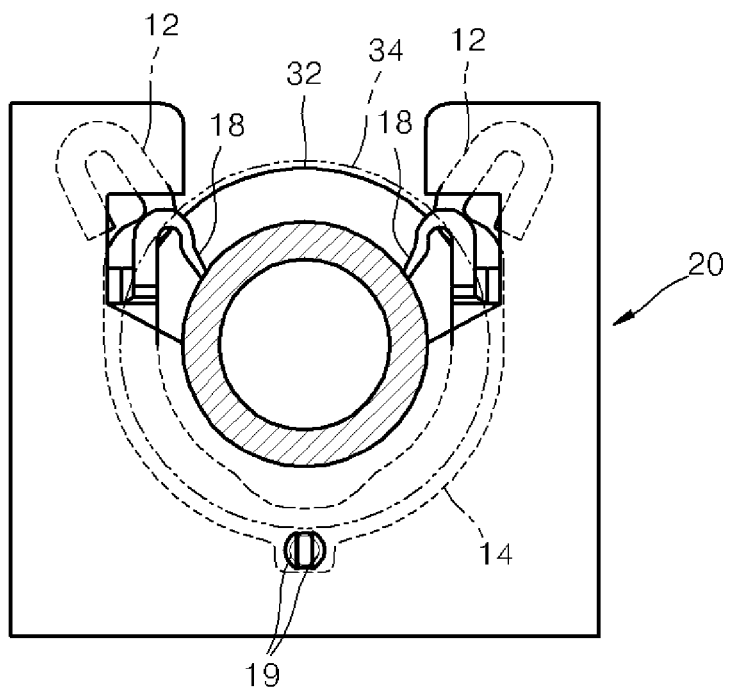
FIG. 8 is a rear view illustrating a state that a support clip is coupled to a bracket according to the embodiment of FIG. 3.

FIG. 3 is a perspective view illustrating a state that a support clip for a vehicle cable is removed from a bracket, according to an embodiment of the present invention. FIG. 4 is a perspective view illustrating a support clip for a vehicle cable according to the current embodiment. FIG. 5 is a front view illustrating a state that a support clip is coupled to a bracket according to the current embodiment. FIG. 6 is a front view illustrating an operation of a support clip according to the current embodiment. FIG. 7 is a front view illustrating a state that a socket member is coupled to a bracket according to the current embodiment. FIG. 8 is a rear view illustrating a state that a support clip is coupled to a bracket according to the current embodiment.

Referring to FIGS. 3 to 8, a support clip 10 according to the current embodiment supports a cable for transmitting power between components of a vehicle so as to fix the cable to the vehicle through a bracket 20. The support clip 10 includes a pair of elastic support parts 12, a first ring body part 14, a second ring body part 16, a pair of removal prevention parts 18, and a support part 19.

The elastic support parts 12 are disposed in positions symmetrical to each other with respect to the first ring body part 14, and are flush with the first ring body part 14. An inlet, through which a socket member 30 connected to the cable passes, is formed between the elastic support parts 12.

Referring to FIG. 6, the elastic support parts 12 elastically support the socket member 30 before the socket member 30 completely passes through the inlet. Thus, when an outer circumferential surface of the socket member 30 contacts the elastic support parts 12 by means of the weight of the socket member 30, the elastic support parts 12 prevent the socket member 30 from passing through the inlet.

For example, when a worker puts the socket member 30 neat the inlet to align the socket member 30 with the elastic support parts 12, the socket member 30 may accidentally pass through the inlet and inappropriately couple to the support clip 10.

However, according to the current embodiment, since the socket member 30 is elastically supported by the elastic support parts 12, only when a worker intentionally applies force to the socket member 30, the socket member 30 is coupled to the support clip 10. Thus, the socket member 30 and the support clip 10 are prevented from being accidently coupled to each other.

The first ring body part 14 is integrally formed with the elastic support parts 12 in one piece, and forms a confining space with the elastic support parts 12 to confine the socket member 30 after passing through the inlet.

That is, after overcoming elastic force of the elastic support parts 12 and passing through the inlet, the socket member 30 is positioned in the confining space as illustrated in FIG. 7. Then, the elastic support parts 12 are returned to the original positions thereof so as to confine the socket member 30 in the confining space, thereby preventing the socket member 30 from being accidentally removed upward.

The second ring body part 16 is integrally formed with the first ring body part 14 in one piece, and has a ring shape parallel to the first ring body part 14. Referring to FIG. 3, a surface of the second ring body part 16 facing the bracket 20 contacts the bracket 20.

The removal prevention parts 18, integrally formed with the second ring body part 16 in one piece, are symmetrical to each other with respect to the second ring body part 16, and are inclined downward from the second ring body part 16.

When the socket member 30 presses the removal prevention parts 18, the removal prevention parts 18 are elastically deformed and moved away from each other. When the removal prevention parts 18 are released, the removal prevention parts 18 return to the original positions thereof. At this point, the removal prevention parts 18 press an outer circumferential surface of the socket member 30, thereby further preventing accidental removal of the socket member 30 from the support clip 10.

In particular, referring to FIGS. 3 and 8, the socket member 30 includes: a first flange 32 disposed between the first ring body part 14 and the second ring body part 16; and a second flange 34 spaced apart from the first flange 32 and contacting a surface of the bracket 20. The surface of the bracket 20 contacting the second flange 34 is opposite to a surface of the bracket 20 contacting the second ring body part 16. The removal prevention parts 18 catch the outer circumferential surface of the socket member 30 between the first and second flanges 32 and 34, thereby preventing removal of the socket member 30 from the support clip 10.

The bracket 20 supports the first ring body part 14 and the second ring body part 16 through the support part 19 that includes a pair of catching hooks. The catching hooks are elastically deformed to pass through a through hole 22 of the bracket 20, and are elastically restored to hook a surface of the bracket 20.

The catching hooks make it possible to couple and decouple the support clip 10 and the bracket 20 without using a tool, thereby assembling and replacing components more efficiently.

Since the support clip 10 configured as described above can be coupled to and decoupled from the bracket 20 without using a tool, components can be assembled and replaced more efficiently. In addition, since the elastic support parts 12 elastically support the socket member 30 before the socket member 30 is completely coupled to the support clip 10, inappropriate assembling of components can be significantly prevented.

Figure 9:
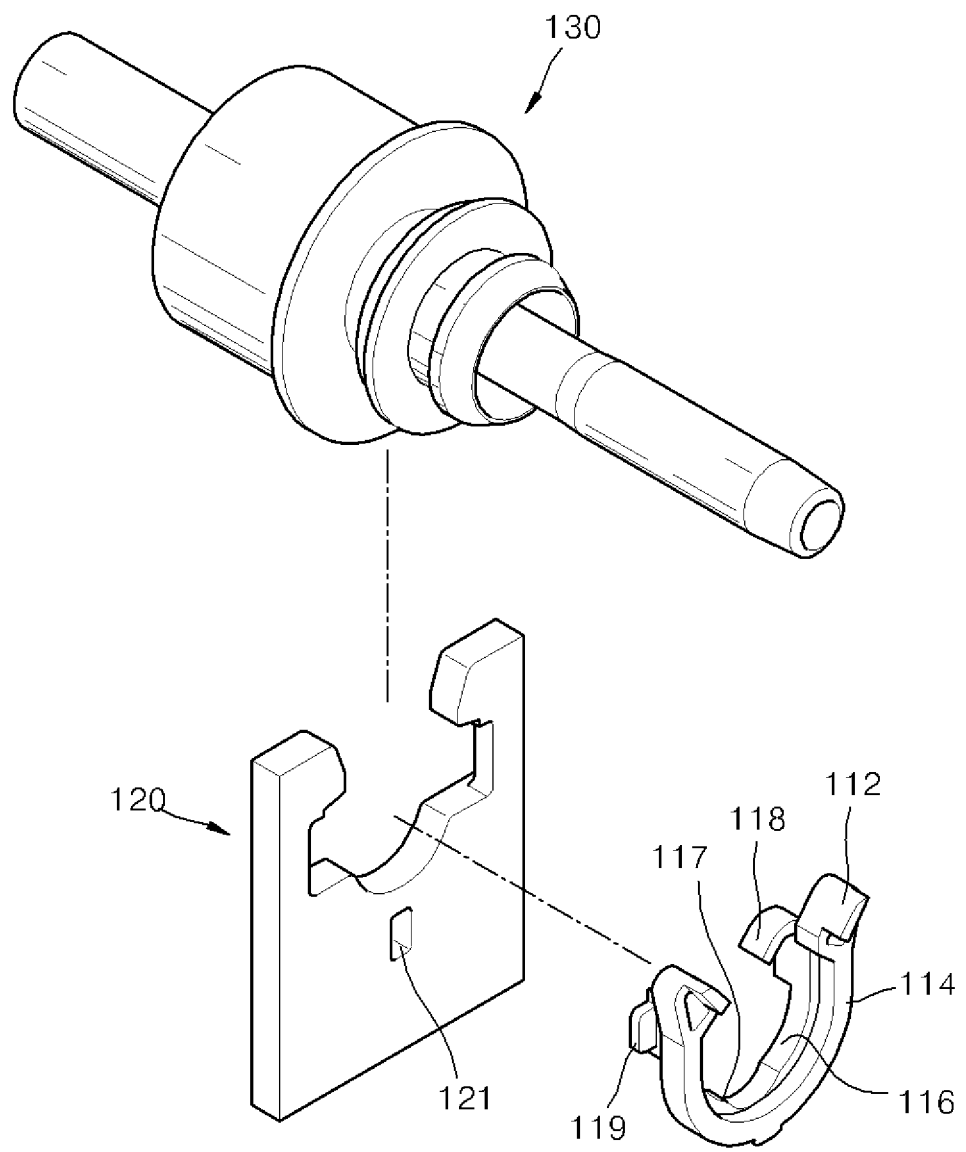
FIG. 9 is an exploded perspective view illustrating a support clip for a vehicle cable, a bracket to which the support clip is coupled, and a socket member, according to another embodiment of the present invention.
Figure 10:
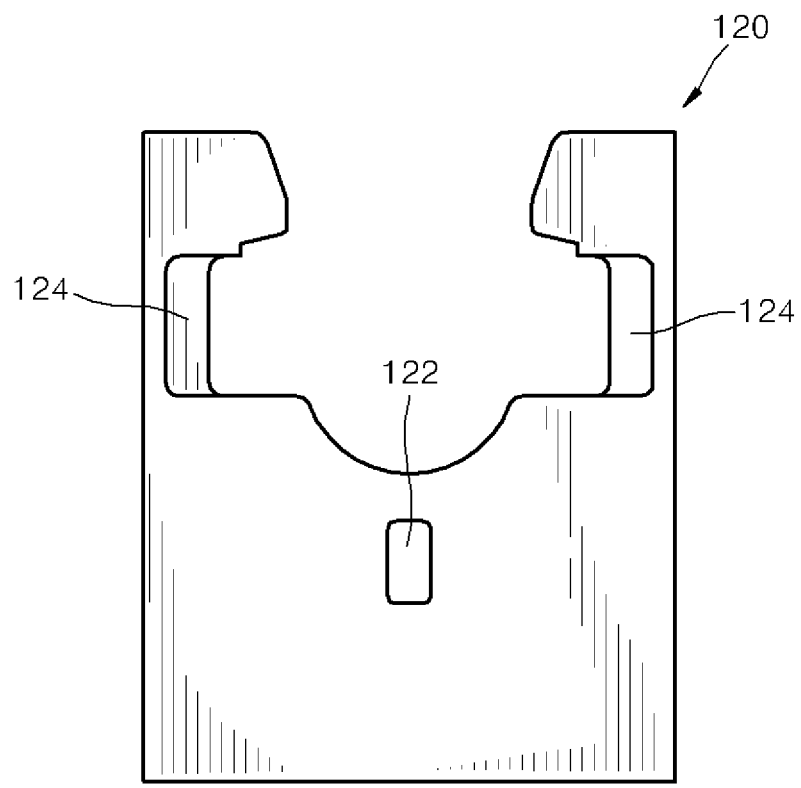
FIG. 10 is a rear view illustrating the bracket of FIG. 9.
Figure 11:
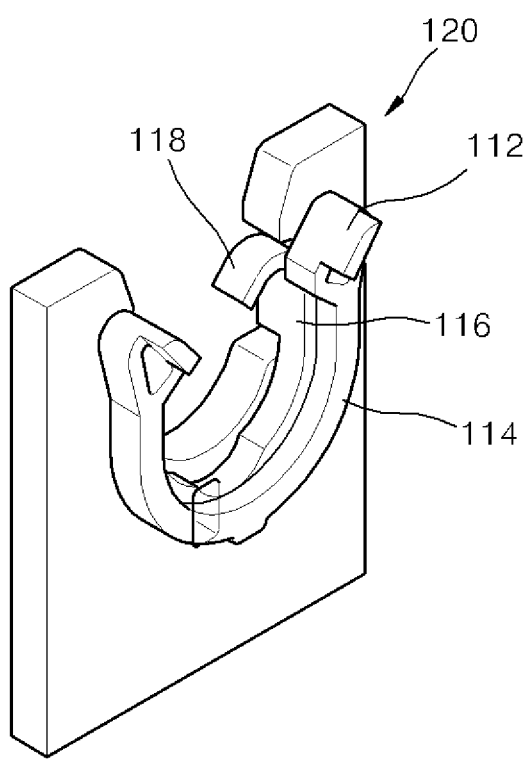
FIG. 11 is a perspective view illustrating coupling between the bracket and the support clip of FIG. 9.
Figure 12:
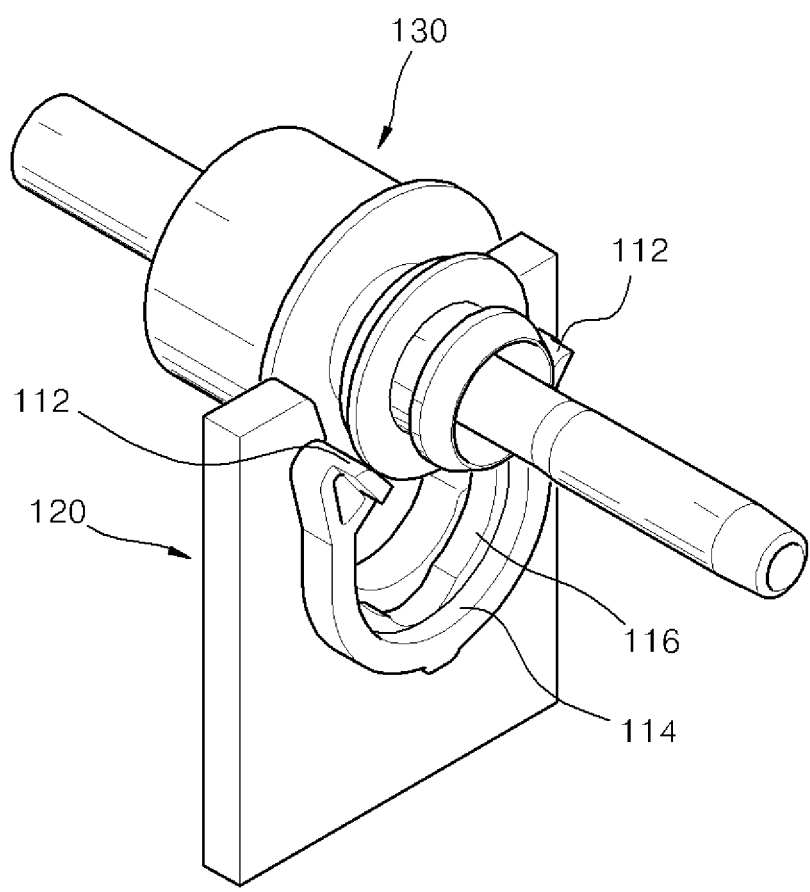
FIG. 12 is a perspective view illustrating a state in which the socket member of FIG. 9 is supported by the support clip of FIG. 9.
Figure 13:
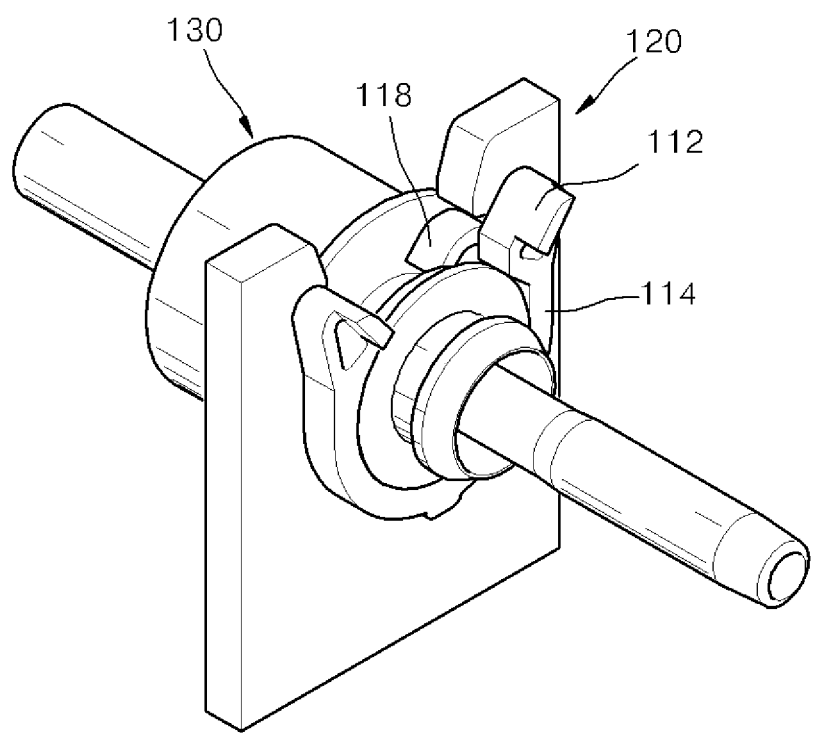
FIG. 13 is a perspective view illustrating a state in which the socket member of FIG. 9 is confined by the support clip of FIG. 9.

FIG. 9 is an exploded perspective view illustrating a support clip for a vehicle cable, a bracket to which the support clip is coupled, and a socket member, according to another embodiment of the present invention. FIG. 10 is a rear view illustrating the bracket of FIG. 9. FIG. 11 is a perspective view illustrating coupling between the bracket and the support clip of FIG. 9. FIG. 12 is a perspective view illustrating a state in which the socket member of FIG. 9 is supported by the support clip of FIG. 9. FIG. 13 is a perspective view illustrating a state in which the socket member of FIG. 9 is confined by the support clip of FIG. 9.

Referring to FIGS. 9 to 13, the current embodiment is similar to the previous embodiments except for a partial configuration, and thus, the partial configuration will be mainly described. In particular, the current embodiment is partially different from the previous embodiments in a configuration for coupling a support clip and a bracket (120).

That is, as in the previous embodiments, a first ring body part (114), a second ring body part (116), elastic support parts (112), and removal prevention parts (118) are provided according to the current embodiment. However, the current embodiment is different from the previous embodiments in that a support part (119) is inserted in an insertion recess (122) disposed in the bracket (120) and a pair of catching pieces (119) are caught in catching recesses (124) disposed in a rear surface of the bracket (120) as illustrated in FIG. 10.

Thus, according to the current embodiment, the reliability of preliminary coupling between the support clip and the bracket (120) (coupling between the support clip and the bracket before a socket member (130) is coupled thereto) can be ensured. In addition, when the support clip is inappropriately coupled to the bracket (120), the inappropriate coupling can be easily corrected for appropriate coupling.

According to the embodiments, since a support clip for a vehicle cable can be coupled to and decoupled from a bracket without using a tool, components can be assembled and replaced more efficiently. In addition, since elastic support parts elastically support a socket member before the socket member is completely coupled to the support clip, inappropriate assembling of components can be significantly prevented.

While this invention has been described with reference to exemplified embodiments thereof, it will be understood by those skilled in the art that various modifications and changes can be made therein without departing from the spirit and scope of the invention as defined by the appended claims.

What is claimed is:

1. A support clip which supports a cable for transmitting power between components of a vehicle so as to fix the cable to the vehicle through a bracket, the support clip comprising:
    a pair of elastic support parts flush with each other and spaced apart from each other to form an inlet through which a socket member connected to the cable passes, wherein when an outer circumferential surface of the socket member contacts the elastic support parts by means of the weight of the socket member, the elastic support parts elastically support the socket member, thereby preventing the socket member from passing through the inlet;
    a first ring body part having a ring shape flush with the elastic support parts, wherein when external force overcoming elastic force of the elastic support parts is applied to the socket member, the first ring body part forms a confining space with the elastic support parts to confine the socket member after passing through the inlet;
    a second ring body part having a ring shape parallel to the first ring body part and connected to the first ring body part, wherein a surface of the second ring body part faces and contacts the bracket;
    a pair of removal prevention parts integrally formed with the second ring body part in one piece, and catching an outer circumferential surface of the socket member positioned in the confining space, to prevent the socket member from being removed upward; and
    a support part through which the first ring body part and the second ring body part are supported by the bracket.

2. The support clip of claim 1, wherein the removal prevention parts are disposed in positions symmetrical to each other with respect to the second ring body part and are inclined downward from the second ring body part such that the removal prevention parts are elastically deformable.

3. The support clip of claim 1, wherein the socket member comprises:
    a first flange disposed between the first and second ring body parts; and
    a second flange spaced apart from the first flange and contacting a surface of the bracket, wherein the surface of the bracket contacting the second flange is opposite to a surface of the bracket contacting the second ring body, and
    the removal prevention parts catch an outer circumferential surface of the socket member between the first and second flanges.

4. The support clip of claim 1, wherein the support part comprises a pair of catching hooks which are elastically deformed to pass through a through hole of the bracket and are elastically restored to hook a surface of the bracket such that the support part is removably coupled to the bracket.

5. The support clip of claim 1, wherein the support part is inserted in an insertion recess disposed in the bracket, and a pair of catching pieces are caught in catching recesses disposed in a rear surface of the bracket such that the support part and the catching pieces securely support the first and second ring body parts against the bracket.

* * * * *